United States Patent
Faler et al.

(10) Patent No.: US 7,438,972 B2
(45) Date of Patent: Oct. 21, 2008

(54) NANOPARTICLE COATINGS FOR FLEXIBLE AND/OR DRAWABLE SUBSTRATES

(75) Inventors: Dennis L. Faler, Glenshaw, PA (US); Anthony D. Kulfan, Mars, PA (US); Victoria A. Trettel, Freeport, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 451 days.

(21) Appl. No.: 10/876,315

(22) Filed: Jun. 24, 2004

(65) Prior Publication Data

US 2005/0287348 A1    Dec. 29, 2005

(51) Int. Cl.
*B32B 5/16* (2006.01)
*B32B 18/00* (2006.01)
*B32B 27/36* (2006.01)
*B32B 27/00* (2006.01)

(52) U.S. Cl. .................... 428/323; 428/325; 428/423.1; 428/446; 428/447; 428/473.5; 428/474.4; 428/480; 428/412; 428/220; 428/331; 428/304.4; 428/315.5; 428/500

(58) Field of Classification Search .................. None
See application file for complete search history.

(56) References Cited

U.S. PATENT DOCUMENTS

| | | | |
|---|---|---|---|
| 3,839,061 A | 10/1974 | Vincent | 106/308 M |
| 3,903,234 A * | 9/1975 | Ikeda et al. | 264/154 |
| 3,911,170 A * | 10/1975 | Honjo et al. | 427/140 |
| 4,499,143 A | 2/1985 | Panush | 428/336 |
| 4,550,060 A * | 10/1985 | Makhlouf et al. | 428/423.1 |
| 5,047,283 A | 9/1991 | Leatherman et al. | 428/209 |
| 5,106,533 A | 4/1992 | Hendrickson et al. | 252/314 |
| 5,196,262 A * | 3/1993 | Schwarz et al. | 428/315.5 |
| 5,201,948 A | 4/1993 | Fasano et al. | 106/311 |
| 5,334,297 A | 8/1994 | Nakada et al. | 204/181.2 |
| 5,340,789 A | 8/1994 | Evans et al. | 503/227 |
| 5,538,548 A | 7/1996 | Yamazaki | 106/20 |
| 5,538,549 A | 7/1996 | Kato et al. | 106/20 |
| 5,716,435 A | 2/1998 | Aida et al. | 106/31.85 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,219 A | 11/1999 | Sakai et al. | 524/441 |
| 6,025,068 A | 2/2000 | Pekala | 428/315.5 |
| 6,030,440 A | 2/2000 | Sekioka et al. | 106/31.65 |
| 6,031,024 A | 2/2000 | Uraki et al. | 523/161 |
| 6,074,761 A | 6/2000 | Wang et al. | 428/511 |
| 6,099,627 A | 8/2000 | Saibara et al. | 106/31.33 |
| 6,114,023 A | 9/2000 | Schwarz et al. | 428/315.5 |
| 6,153,001 A | 11/2000 | Suzuki et al. | 106/31.65 |
| 6,267,810 B1 | 7/2001 | Pfaff et al. | 106/415 |
| 6,410,619 B2 | 6/2002 | Greene et al. | 524/88 |
| 6,417,249 B1 | 7/2002 | Nguyen et al. | 523/201 |
| 6,544,634 B1 | 4/2003 | Abrams et al. | 428/212 |
| 6,607,994 B2 * | 8/2003 | Soane et al. | 442/59 |
| 6,916,878 B2 * | 7/2005 | Bremser et al. | 524/847 |
| 2002/0193514 A1 | 12/2002 | Wang et al. | |
| 2005/0233147 A1 | 10/2005 | Niemeier et al. | 428/411.1 |

FOREIGN PATENT DOCUMENTS

| | | |
|---|---|---|
| EP | 1006161 A1 | 6/2000 |
| WO | 97/16479 | 5/1997 |
| WO | WO02/079308 | * 10/2002 |
| WO | 03/102089 | 12/2003 |
| WO | 2006/012157 | 2/2006 |

* cited by examiner

*Primary Examiner*—Sheeba Ahmed
(74) *Attorney, Agent, or Firm*—Diane R. Myers; Donald R. Palladino

(57) ABSTRACT

Flexible and/or drawable substrates having coatings comprising a dispersion of resin coated nanoparticles are disclosed, as are laminated articles comprising such flexible and/or drawable substrates.

37 Claims, 4 Drawing Sheets

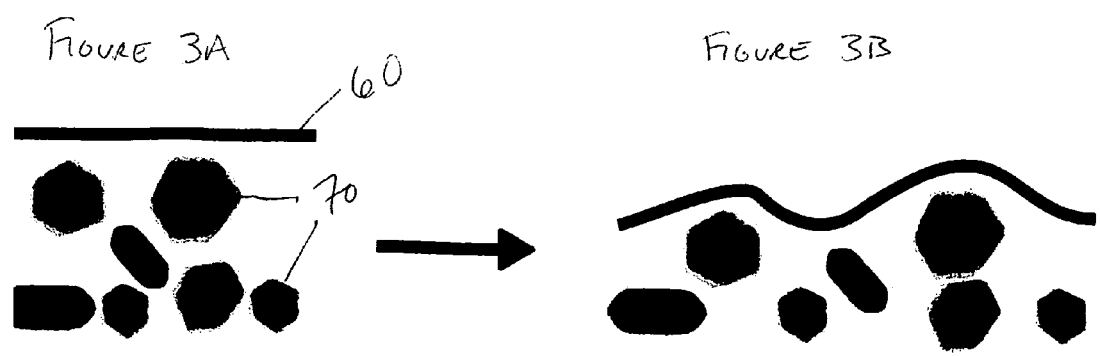

NANOPARTICLE COATINGS FOR FLEXIBLE AND/OR DRAWABLE SUBSTRATES

FIELD OF THE INVENTION

The present invention relates to coated flexible and/or drawable substrates, and more particularly to flexible and/or drawable substrates having coatings with a dispersion of resin-coated nanoparticles.

BACKGROUND INFORMATION

Nanoparticles can be used for many purposes in coatings. For example, "hard" nanoparticles can be included in coatings to impart mar and/or scratch resistance, and pigment nanoparticles can be used in coatings to impart color. Nanoparticles have a relatively large surface area, however, and will therefore often agglomerate in a coating. While this agglomeration can be avoided to some extent by the use of grind vehicles, dispersants, and the like, the presence of these components in the coating can have negative effects on the function and appearance of the coating. Accordingly, there is a need for coatings having nanoparticulate dispersions in which these drawbacks are minimized if not avoided. There is a particular need for such coatings for application to flexible and/or drawable substrates; upon distortion, elongation, and the like that such substrates undergo, micron-sized particles or agglomerated nanoparticles can often distort the coating surface causing both appearance and performance issues. Accordingly, there is also a need for flexible and/or drawable substrates having coatings in which the distortion caused by particles is minimized, if not eliminated.

SUMMARY OF THE INVENTION

The present invention provides flexible and/or drawable substrates at least a portion of which is coated with a coating comprising a dispersion of resin-coated nanoparticles. Methods for making and using such substrates are also within the scope of the present invention. A particular use for the coated flexible and/or drawable substrates is in the area of manufacturing laminated articles. The present coated flexible and/or drawable substrates are typically durable and are capable of withstanding substantial elongation before breaking. Because nanoparticles are used, thinner coatings can be applied to the flexible and/or drawable substrates; the thinner coatings are better able to withstand the stresses to which the flexible and/or drawable substrates are subjected, such as those that occur during the lamination and/or molding process. In addition to being particularly suitable for flexible and/or drawable substrates, the present coatings provide desirable visual characteristics including high gloss. This can eliminate the need for a subsequent clear coat layer as desired in certain applications. Although not wishing to be bound by any mechanism, this is believed to result from the minimized surface distortion obtained when using the particles of the present invention; smooth mold surfaces in molding and laminate procedures are also believed to contribute to enhanced gloss in certain embodiments.

BRIEF DESCRIPTION OF THE FIGURES

FIG. 3 is a partially schematic side view of a coating layer having microparticles and/or agglomerated nanoparticles in an unstretched (FIG. 3a) and stretched (FIG. 3b) configuration.

DETAILED DESCRIPTION OF THE INVENTION

Figure 1:
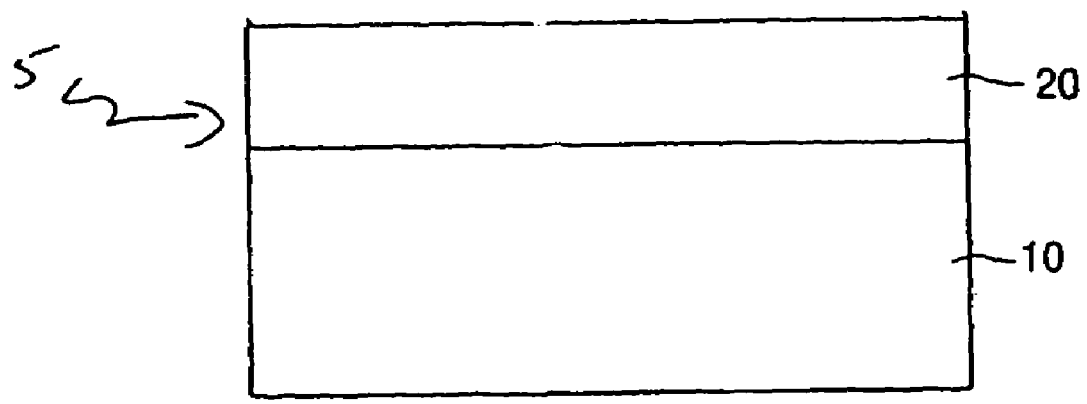
FIG. 1 is a partially schematic side view of a flexible and/or drawable substrate coated with a coating comprising a dispersion of resin-coated nanoparticles in accordance with an embodiment of the present invention.

The present invention is directed to a coated flexible and/or drawable substrate comprising a flexible and/or drawable substrate and a coating over at least a portion of the substrate, wherein the coating comprises a dispersion of resin-coated nanoparticles.

Any flexible and/or drawable substrate can be used according to the present invention including porous or nonporous substrates, conductive or nonconductive substrates, and polymeric or nonpolymeric substrates. Examples include but are not limited to mylar, metal foil, microporous sheets, stretch wrap, polyethylene, polypropylene, polyvinylidene chloride, polyvinyl chloride, acrylic polymer and/or copolymer films, thermoplastic urethane (TPU), synthetic leather, natural leather, finished natural leather, finished synthetic leather, ethylene vinyl acetate foam (EVA foam), polyolefins and polyolefin blends, polyvinyl acetate and copolymers, urethane elastomers, microfibers, synthetic textiles and natural textiles. As used herein, the term "flexible substrate" refers to any substrate that can undergo mechanical stresses, such as bending, stretching and the like, and substantially return to its original shape. As used herein, the term "drawable substrate" refers to any substrate that can be drawn, stretched or elongated and that may or may not substantially return to its original shape. It will be appreciated that the desire to minimize coating surface distortion is relevant to substrates that are flexible and/or drawable.

As used herein, the term "microporous sheet" means a sheet comprising a polymer matrix, an interconnecting network of pores and, optionally, filler particles. The matrix of the microporous sheet may comprise substantially water-insoluble thermoplastic organic polymer. Many kinds of such polymers are suitable for use as the matrix. In general, any substantially water-insoluble thermoplastic organic polymer that can be extruded, calendered, pressed or rolled into film, sheet, strip or web may be used. The polymer may be a single polymer or it may be a mixture of polymers. The polymers may be homopolymers, copolymers, random copolymers, block copolymers, graft copolymers, atactic polymers, isotactic polymers, syndiotactic polymers, linear polymers or branched polymers. When mixtures of polymers are used, the mixture may be homogeneous or it may comprise two or more polymeric phases.

Examples of classes of suitable substantially water-insoluble thermoplastic organic polymers of the microporous sheets include the thermoplastic polyolefins, poly(halo-substituted olefins), polyesters, polyamides, polyurethanes, polyureas, poly(vinyl halides), poly(vinylidene halides), polystyrenes, poly(vinyl esters), polycarbonates, polyethers, polysulfides, polyimides, polysilanes, polysiloxanes, polycaprolactones, polyacrylates, and polymethacrylates. Hybrid classes, for example, thermoplastic poly(urethane-ureas), poly(ester-amides), poly(silane-siloxanes), and poly(ether-esters) are within contemplation. Examples of specific substantially water-insoluble thermoplastic organic polymers include thermoplastic high density polyethylene, low density polyethylene, ultrahigh molecular weight polyethylene, polypropylene (atactic, isotactic, or syndiotactic), poly(vinyl chloride), polytetrafluoroethylene, copolymers of ethylene and acrylic acid, copolymers of ethylene and methacrylic acid, poly(vinylidene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly (methyl methacrylate).

The finely divided, substantially water-insoluble particulate filler of the microporous sheets of the present invention may comprise siliceous and/or non-siliceous particles. The filler particles typically comprise at least 30 or 40 weight percent of the microporous material up to about 70 or 80 weight percent. In one embodiment, the filler particles are the predominant component of the sheet in comparison with the polymer matrix on a weight percent basis. Thus, the filler particles may comprise greater than 50 weight percent of the combined total of the polymer matrix and filler particles. For example, the filler particles may comprise greater than 60 weight percent.

A particularly suitable particulate filler is finely divided substantially water-insoluble siliceous particles. Examples of suitable siliceous particles include particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Of the silicas, precipitated silica, silica gel or fumed silica may be particularly suitable.

Examples of non-siliceous filler particles include particles of titanium oxide, zinc oxide, antimony oxide, zirconia, magnesia, alumina, zinc sulfide, barium sulfate, strontium sulfate, calcium carbonate, magnesium carbonate, magnesium hydroxide, and finely divided substantially water-insoluble flame retardant filler particles such as particles of ethylenebis (tetra-bromophthalimide), octabromodiphenyl oxide, decabromodiphenyl oxide, and ethylenebisdibromonorbornane dicarboximide.

The filler particles typically have an average particle size of less than 40 micrometers. In the case of precipitated silica, the average ultimate particle size (irrespective of whether or not the ultimate particles are agglomerated) may be less than 0.1 micrometer.

Minor amounts, usually less than 5 percent by weight, of other materials used in processing such as lubricant, processing plasticizer, organic extraction liquid, water and the like may optionally also be present. Additional materials introduced for particular purposes may optionally be present in the microporous material in small amounts, usually less than 15 percent by weight. Examples of such materials include antioxidants, ultraviolet light absorbers, reinforcing fibers such as chopped glass fiber strand and the like.

The microporous sheets also comprise a network of interconnecting pores that communicate substantially throughout the material. On a coating-free basis, the pores typically constitute from 30 to 95 volume percent of the microporous material. For example, the pores may constitute from 60 to 75 percent by volume of the microporous material. On a coating-free basis, the volume average diameter of the pores may be at least 0.02 micrometers, typically at least 0.04 micrometers. The volume average diameter of the pores is also typically less than 0.5 micrometer.

Some examples of microporous sheets are disclosed in U.S. Pat. Nos. 4,833,172; 4,861,644; and 6,114,023, which are incorporated herein by reference. Commercially available microporous sheets are sold under the designation TESLIN by PPG Industries, Inc.

At least a portion of the flexible and/or drawable substrate according to the present invention is coated with a coating comprising a dispersion of resin-coated nanoparticles. Any nanoparticle can be used according to the present invention. A "nanoparticle" is any particle having a particle size less than 1 micron. Particularly suitable nanoparticles for use in the present invention are those having an average particle size of 300 nanometers or less, such as an average particle size of 200 nanometers or less, or of 100 nanometers or less.

The shape (or morphology) of the particles can vary depending upon the specific embodiment of the present invention and its intended application. For example, generally spherical morphologies (such as solid beads, microbeads, or hollow spheres), can be used, as well as particles that are cubic, platy, acicular (elongated or fibrous) or lamellar. Additionally, the particles can have an internal structure that is hollow, porous and/or void free; e.g., a hollow center with porous or solid walls.

Depending on the desired properties and characteristics of the coating compositions containing the nanoparticle dispersions of the present invention (e.g., coating hardness, scratch resistance, stability, or color), it will be recognized by one skilled in the art that different particles and/or different average particle sizes can be used.

Nanoparticles suitable for use in the present invention can include any of the nanosized inorganic, organic, or inorganic/organic hybrid materials known in the art. For example, the particles can be formed from polymeric and/or nonpolymeric inorganic materials, polymeric and/or nonpolymeric organic materials, and/or composite materials. As used herein, "formed from" denotes open, e.g., "comprising," claim language. As such, it is intended that a composition "formed from" a list of recited components be a composition comprising at least these recited components, and can further comprise other, non-recited components.

As used herein, the term "polymeric inorganic material(s)" means a polymeric material having a backbone repeat unit based on an element or elements other than carbon, while the term "polymeric organic material(s)" means synthetic polymeric materials, semi-synthetic polymeric materials and/or natural polymeric materials having a backbone repeat unit based on carbon. An "organic material" refers to a carbon-containing compound and an "inorganic material" refers to any material that is not organic. As used herein, the term "composite material" means a combination of two or more differing materials. The particles formed from composite materials may have a hardness at their surface that is different from the hardness of the internal portions of the particle beneath its surface.

The nanoparticles can comprise, for example a core of essentially a single inorganic oxide such as silica in colloidal, fumed; or amorphous form, alumina or colloidal alumina, titanium dioxide, iron oxide, cesium oxide, yttrium oxide, colloidal yttria, zirconia, e.g., colloidal or amorphous zirconia, and mixtures thereof, or an inorganic oxide of one type upon which is deposited an organic oxide of another type.

Nonpolymeric, inorganic materials useful in forming the nanoparticles of the present invention include graphite; metals, such as molybdenum, platinum, palladium, nickel, aluminum, copper, gold, iron, silver, alloys, and mixtures thereof; ceramic materials; oxides, such as zinc oxide; carbides; nitrides, such as boron nitride; borides; sulfides, such as molybdenum disulfide, tantalum disulfide, tungsten disulfide, and zinc sulfide; silicates, such as aluminum silicates and magnesium silicates, such as vermiculite; carbonates; sulfates; and hydroxides. Other suitable materials include mica, talc, gypsum, kaolinite, calcite, cadmium iodide, silver sulfide, molybdenum diselenide, tantalum diselenide, tungsten diselenide and mixtures thereof, as well as stearates (such as zinc stearate and aluminum stearate), diamond, carbon black and stearamide.

In one embodiment of the present invention the nanoparticles can be selected from fumed silica, amorphous silica, colloidal silica, alumina, colloidal alumina, fumed alumina, calcined alumina, titanium dioxide, iron oxide, cesium oxide, yttrium oxide, colloidal yttria, zirconia, colloidal zirconia, and mixtures thereof. In another embodiment of the present invention, the nanoparticles comprise colloidal silica. These materials can be surface treated or untreated. Other useful nanoparticles include surface-modified silicas such as those described in U.S. Pat. No. 5,853,809 at column 6, line 51 to column 8, line 43, which is incorporated herein by reference.

A nanoparticle used according to the present invention can be formed from a primary material that is coated, clad or encapsulated with one or more secondary materials to form a composite material that has a harder surface. Alternatively, a nanoparticle can be formed from a primary material that is coated, clad or encapsulated with a different form of the primary material to form a composite material that has a harder surface.

The nanoparticles can be formed from inorganic polymeric materials. Nonlimiting examples of useful inorganic polymeric materials include polyphosphazenes, polysilanes, polysiloxanes, polygermanes, polymeric sulfur, polymeric selenium, silicones and mixtures thereof. A particle formed from crosslinked siloxanes, commercially available from Toshiba Silicones Company, Ltd. of Japan as TOSPEARL, is suitable for use in the present invention.

The nanoparticles can be formed from synthetic, organic polymeric materials. For example, thermoset materials or thermoplastic materials can be used. Nonlimiting examples of suitable thermoplastic materials include thermoplastic polyesters such as polyethylene terephthalate, polybutylene terephthalate and polyethylene naphthalate, polycarbonates, polyolefins such as polyethylene, polypropylene and polyisobutene, acrylic polymers such as copolymers of styrene and an acrylic acid monomer and polymers containing methacrylate, polyamides, thermoplastic polyurethanes, vinyl polymers, and mixtures thereof.

Nonlimiting examples of suitable thermoset materials include thermoset polyesters, vinyl esters, epoxy materials, phenolics, aminoplasts, thermoset polyurethanes and mixtures thereof. A specific, nonlimiting example of a synthetic polymeric particle formed from an epoxy material is an epoxy microgel particle.

Particularly suitable nanoparticles include organic and inorganic pigments. Examples include azo compounds (monoazo, di-azo, salt type (lakes), benzimidazolone, condensation, metal complex, isoindolinone, isoindoline), and polycyclic (phthalocyanine, quinacridone, perylene, perinone, diketopyrrolo pyrrole, thioindigo, anthraquinone indanthrone, anthrapyrimidine, flavanthrone, pyranthrone, anthanthrone, dioxazine, triarylcarbonium, quinophthalone) pigments, and mixtures thereof. In one embodiment of the present invention, the pigment is selected from perylenes, quinacridones, phthalocyanines, isoindolines, dioxazines (such as, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Any of the nanoparticulate pigments can be unsubstituted or substituted and if substituted may contain any number of substituents. Substituted perylenes may be substituted at imide nitrogen atoms for example, and substituents may include alkyl groups having 1 to 10 carbon atoms, alkoxy groups having 1 to 10 carbon atoms and/or halogens; the diimides and dianhydrides of perylene-3,4,9,10-tetracarbbxylic acid are particularly suitable. Phthalocyanine pigments may be partially substituted, for example, with one or more alkyl groups having 1 to 10 carbon atoms, alkoxy groups having 1 to 10 carbon atoms, halogens, and/or other substituents typical of phthalocyanine pigments.

Quinacridone pigments can be unsubstituted or substituted, for example, with one or more alkyl groups having 1 to 10 carbon atoms, alkoxy groups having 1 to 10 carbon atoms, halogens and/or other substituents typical of quinacridone pigments.

Mixtures of any of the inorganic and/or organic nanoparticles can also be used. The exact choice of nanoparticles will depend upon the specific application and performance requirements of the coatings.

The nanoparticles can be formed by any of a number of various methods known in the art. In one embodiment, the nanoparticulates are prepared by pulverizing and classifying the dry particulate material. For example, bulk pigments such as any of the pigments discussed above, can be milled with milling media having a particle size of less than 0.5 millimeters (mm), or less than 0.3 mm, or less than 0.1 mm. The pigment particles typically are milled to nanoparticulate sizes in a high energy mill in solvent (either water, organic solvent, or a mixture of the two), optionally in the presence of a polymeric grind resin. It is a feature of the present invention that the amount of grind vehicle used can be minimal, since the grind vehicle is typically used with nanoparticles to avoid agglomeration and the present invention avoids or minimizes agglomeration of the nanoparticles by coating the nanoparticles. A dispersant can also be used, for example, (if in organic solvent) SOLSPERSE 32500 available from Avecia, Inc. of Wilmington, Del., or (if in water) SOLSPERSE 27000, also available from Avecia, Inc. Either hydrophobic or hydrophilic dispersants can be used depending on the needs of the user. Other suitable methods for producing the nanoparticles include crystallization, precipitation, gas phase condensation, and chemical attrition (i.e., partial dissolution). Any method for producing the nanoparticles can be employed; reagglomeration of the nanoparticles should be minimized or avoided altogether if possible.

As noted above, the coatings according to the present invention comprise a dispersion of resin-coated nanoparticles. As used herein, "dispersion of resin-coated nanoparticles" or "nanoparticle dispersion" refers to a continuous phase in which is dispersed discreet "composite microparticles" that comprise the nanoparticle and the resin coating the nanoparticle. It will be appreciated that the composite microparticles are themselves dispersions (of the nanoparticle in resin). The composite microparticles of the present invention are relatively stable, that is, an uncured coating comprising the composite microparticles will have substantially no agglomeration or settling of nanoparticles upon standing. In contrast, uncoated nanoparticles will typically not be stable and will experience agglomeration and/or settling upon standing; once agglomeration occurs it can be difficult if not impossible to redisperse the nanoparticles. The present invention addresses this concern by providing stable coatings with substantially nonagglomerating particles. "Coated" as used in reference to the resin-coated nanoparticles refers to a coating on at least a portion of the particle.

The composite microparticles in the nanoparticle dispersion can be prepared with one or more polymerizable ethylenically unsaturated monomers, one or more prepolymers, and/or one or more polymers. Any ethylenically unsaturated monomer(s) and/or prepolymer(s) and/or polymer(s) can be used, and can be formed from any suitable starting material. For example, the nanoparticles can be dispersed in monomer(s), prepolymer(s) and/or polymer(s). In one embodiment, the nanoparticles are dispersed in a medium that comprises at least some monomer, and the monomer is polymerized in the presence of the nanoparticle. In another embodiment, the nanoparticle is dispersed in a medium that comprises at least some prepolymer, and the prepolymer is further polymerized in the presence of the nanoparticle. In another embodiment, the nanoparticle is dispersed in a medium that comprises at least some polymer that has already been formed. Any combination of monomer(s), prepolymer(s) and/or polymer(s) is within the present invention.

The polymerizable, ethylenically unsaturated monomers can include any ethylenically unsaturated monomers, including vinyl monomers, known in the art. Nonlimiting examples of suitable ethylenically unsaturated carboxylic acid functional group-containing monomers include (meth)acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and like terms are intended to include both acrylic and methacrylic.

Nonlimiting examples of other useful ethylenically unsaturated monomers include alkyl esters of (meth)acrylic acids, such as ethyl (meth)acrylate, methyl (meth)acrylate, butyl (meth)acrylate, 2-ethylhexyl (meth)acrylate, 2-hydroxyethyl (meth)acrylate, hydroxypropyl (meth)acrylate, hydroxy butyl (meth)acrylate, isobornyl (meth)acrylate, lauryl (meth) acrylate, and ethylene glycol di(meth)acrylate; vinyl aromatics such as styrene and vinyl toluene; (meth)acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

The ethylenically unsaturated monomers can include ethylenically unsaturated beta-hydroxy ester functional monomers, such as those derived from the reaction of an ethylenically unsaturated acid functional monomer, such as a monocarboxylic acid, for example, acrylic acid, and an epoxy compound that does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like. Suitable epoxy compounds include those having the following structure (I):

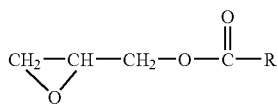

where R is a hydrocarbon radical containing from 4 to 26 carbon atoms. Suitable glycidyl esters include those commercially available from Shell Chemical Company under the tradename CARDURA E and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

As discussed above, the nanoparticles can also be admixed with one or more prepolymers and/or polymers in addition to or instead of the ethylenically unsaturated monomer(s). A prepolymer will be understood as referring to any polymer that has functionality that can be further polymerized to form a larger polymer. Any suitable prepolymer can be used. Suitable polymers include acrylic polymers, polyurethane polymers, polyester polymers, polyether polymers, silicon-based polymers (that is, a polymer having at least one —SiO— unit in the backbone), co-polymers thereof, and mixtures thereof. Such polymers are described, for example, in U.S. Provisional Application No. 60/482,167, incorporated by reference herein.

Generally, the polymers used in the present invention can have a weight average molecular weight (Mw) ranging from 1000 to 20,000, or 1500 to 15,000, or 2000 to 12,000 as determined by gel permeation chromatography using a polystyrene standard, and can be either thermosettable or thermoplastic.

In certain embodiments of the present invention, the polymers may be used with one or more crosslinking or curing agents. Suitable crosslinking agent(s) can be selected by one skilled in the art based upon the polymer(s) and/or monomer(s) used. A list of suitable curing agents is below.

In certain embodiments of the present invention, nanoparticulates, such as nanopigments, are ground with a hydrophobic dispersant in the presence of organic solvent. Any standard grinding techniques can be employed to achieve the desired particle size. The "solvent-borne nanoparticle dispersion" can then be used in the formation of coatings according to the present invention. Suitable solvents include glycol ethers, such as ethylene glycol monobutyl ether, ethylene glycol monohexyl ether, butyl carbitol, PROPASOL B, DOWANOL PPh; alcohols, such as butanol, 2-ethyl hexanol, tridecyl alcohol; ketones, such as methyl isobutyl ketone, methylpropyl ketone; esters, such as butyl acetate, DOWANOL PM acetate, TEXANOL; aromatic hydrocarbons, such as xylene, toluene; and aliphatic hydrocarbons, such as heptane. In other embodiments, the nanoparticulates, such as nanopigments, are ground with a hydrophilic dispersant in the presence of water; this "water-borne nanoparticle dispersion" is particularly suitable when the coating is water-based.

In one embodiment of the present invention, an aqueous dispersion of microparticles is prepared by admixing the nanoparticles, such as in the solvent-borne or water-borne nanoparticle dispersions described above, with the desired monomer(s), prepolymer(s) and/or polymer(s) and subjecting the aqueous admixture to conditions so as to particularize the admixture. For example, the admixture can be subjected to the high stress and/or high shear, which can be accomplished by any techniques known in the art, such as liquid-liquid impingement techniques that are generally regarded as high stress, and high speed shearing by mechanical means. Any mode of applying stress and/or shear to the admixture can be utilized as long as sufficient stress and/or shear is applied to achieve particularization of the admixture and to achieve the desired particle size distribution. For example, the admixture can be subjected to the appropriate stress by use of a MICROFLUIDIZER emulsifier, available from Microfluidics Corporation, Newton, Mass. Another means of applying stress would be the use of ultrasonic energy or cavitation. The result is a composite microparticle, or a resin-coated nanoparticle.

In certain embodiments of the present invention wherein one or more ethylenically unsaturated monomers are used, alone or in addition to one or more prepolymers and/or polymers, the monomers can be polymerized following the application of high stress conditions. In one embodiment, this polymerization occurs by free radical cure. In these embodiments, a free radical initiator is typically used. Both water soluble and oil soluble initiators can be used.

Examples of water soluble initiators include ammonium peroxydisulfate, potassium peroxydisulfate and hydrogen peroxide. Examples of oil soluble initiators include t-butyl hydroperoxide, dilauryl peroxide and 2,2'-azobis(isobutyronitrile). Generally, the polymerization reaction is carried out at a temperature ranging from 20° C. to 80° C. The polymerization can be carried out in either a batch or a continuous process. The length of time necessary to carry out the polymerization can range from 3 minutes to 6 hours, provided that the time is sufficient to form a polymer in situ from the one or more ethylenically unsaturated monomer(s). The result is the resin-coated nanoparticles in a dispersion.

In certain embodiments of the invention, the solvent-borne nanoparticle dispersion prepared as described above is used. For example, the solvent-based nanoparticle dispersion can be admixed with one or more ethylenically unsaturated monomers, alone or with one or more prepolymers and/or polymers, as described above. Mixing can be accomplished by any means. The hydrophobically treated nanoparticles are in the organic phase of the emulsion and become coated with the resin as it polymerizes around them. The solvent-based nanoparticle dispersion could also be mixed with an undispersed resin in an organic solvent, and then dispersed in water. An undispersed electrocoat resin would be particularly suitable. The hydrophobically treated nanoparticles cause partitioning into composite mica particles wherein the nanoparticle is coated with the resin; these composite microparticles comprise an organic phase dispersed in the aqueous or water-based phase that is the continuous phase. The result, regardless of the method used, is a water-based dispersion of resin-coated nanoparticles.

It will be appreciated that the present coatings and methods for making these coatings differ from, for example, standard electrocoat formulations, in which the pigment grind takes place in a water-dipsersed grind vehicle. Electrocoats and other embodiments of the present invention can be prepared as described herein by, for example, grinding in solvent, and disposing the grind in a water-dispersible, solvent-borne resin; this results in a solvent-wet pigment trapped inside a resin particle in water.

The coatings of the present invention can be either water-based or solvent-based. In one embodiment, the aqueous phase of the water-based coating is substantially all water. However, for some monomer and/or polymer systems, it can be desired to also include a minor amount of inert organic solvent to lower the viscosity of the polymer. In certain embodiments of the present invention, the amount of organic solvent present in the water-based or aqueous dispersion is less than 20 weight percent, such as less than 10 weight percent, less than 5 weight percent, or less than 2 weight percent based on total weight of the coating. Examples of suitable solvents include, but are not limited to, propylene glycol monobutyl ether, ethylene glycol monohexyl ether, ethylene glycol monobutyl ether, n-butanol, benzyl alcohol, mineral spirits include glycol ethers, such as butyl cellosolve, hexyl cellosolve; butyl carbitol, PROPASOL B, DOWANOL PPh; alcohols, such as butanol, 2-ethyl hexanol, tridecyl alcohol; ketones, such as methyl isobutyl ketone, methylpropyl ketone; esters, such as butyl acetate, DOWANOL PM acetate, TEXANOL; aromatic hydrocarbons, such as xylene, toluene; and aliphatic hydrocarbons, such as heptane, and mixtures thereof. The coating can also be solvent-based using these solvents or any other suitable solvent. As used herein, "water-based" and like terms refer to dispersions and/or coatings wherein greater than 50 percent of the solvent is water and "solvent-based" and like terms refer to dispersions and/or coatings wherein greater than 50 percent of the solvent is not water.

In addition, either solvent-borne or water-borne nanoparticle dispersions, prepared as described above or by any other suitable means, can be used according to the present invention. When using a solvent-borne nanoparticle dispersion in a water-based coating, it should be done so as to avoid flocculation.

The nanoparticle dispersion and/or coatings of the present invention can further include a surfactant or dispersant, to minimize or eliminate settling, coagulation and/or flocculation of the composite nanoparticles. The surfactant can be added at any point during formation of the dispersion and/or coating. Anionic, cationic, and nonionic surfactants are suitable for use in the present invention. The surfactants, if used, will typically range from 1 to 10 weight percent, such as less than 2 weight percent based on total solids present in the dispersion. Alternatively, any amount can be used to produce a stable dispersion of composite microparticles in the medium. By "stable dispersion" is meant that the composite microparticles do not undergo substantial settling, coagulation or flocculation upon standing.

As discussed above, the coatings used in the present invention comprise a dispersion of resin-coated nanoparticles. In one embodiment of the present invention, the nanoparticle dispersion is an additive, and the coating further comprises one or more additional film-forming resins. In this embodiment, the nanoparticle dispersion generally comprises between 10 and 90 weight percent of the coating, such as 20 to 80 weight percent or 30 to 60 weight percent. Within the dispersion or composite microparticle itself, the nanoparticles generally comprise 2 to 40 weight percent, such as 2 to 20 or 2 to 10 weight percent of the dispersion, while the coating generally comprises 60 to 98, such as 80 to 98 or 90 to 98 weight percent of the composite microparticle. The film-forming resin generally comprises 10 to 90 weight percent, such as 20 to 80 weight percent of the coating, based on the total weight of the coating. If the coating further comprises a curing agent for the film-forming resin, the curing agent is typically in an amount from 2 to 50 weight percent, such as 5 to 30 or 10 to 20 weight percent of the total coating weight.

Any resin that forms a film can be used according to the present invention, absent compatibility problems.

In an embodiment of the present invention, the film-forming polymer comprises one or more reactive functional groups reactive with one or more functional groups of a curing agent. Examples include hydroxyl, epoxy, carbamate, amino or carboxylic acid group-containing acrylic copolymers; hydroxyl or carboxylic acid-containing polyester polymers and oligomers; isocyanate or hydroxyl-containing polyurethane polymers; and amine or isocyanate-containing polyureas.

Curing agents suitable for use in the curable coating composition of the present invention can include aminoplast resins and phenoplast resins and mixtures thereof, as curing agents for OH, COOH, amide, and carbamate functional group containing materials. Examples of suitable aminoplast and phenoplast resins are described in U.S. Pat. No. 3,919,351 at col. 5, line 22 to col. 6, line 25, hereby incorporated by reference. Also suitable are polyisocyanates and blocked polyisocyanates as curing agents for OH and primary and/or secondary amino group-containing materials. Examples described in U.S. Pat. No. 4,546,045 at col. 5, lines 16 to 38; and in U.S. Pat. No. 5,468,802 at col. 3, lines 48 to 60, both hereby incorporated by reference. Anhydrides as curing agents for OH and primary and/or secondary amino group containing materials are described in U.S. Pat. No. 4,798,746 at col. 10, lines 16 to 50; and in U.S. Pat. No. 4,732,790 at col. 3, lines 41 to 57, both hereby incorporated by reference. Polyepoxides as curing agents for COOH functional group containing materials are described in U.S. Pat. No. 4,681,811 at col. 5, lines 33 to 58, hereby incorporated by reference. Polyacids as curing agents for epoxy functional group containing materials are described in U.S. Pat. No. 4,681,811 at col. 6, line 45 to col. 9, line 54, hereby incorporated by reference. Polyols, that is, materials having an average of two or more hydroxyl groups per molecule, can be used as curing agents for NCO functional group containing materials and anhydrides and esters and are well known in the art. Examples of such polyols are described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference. Polyamines, can also be used as curing agents for NCO functional group containing materials and for carbonates and unhindered esters and are described in U.S. Pat. No. 4,046,729 at col. 6, line 61 to col. 7, line 26, hereby incorporated by reference. When desired, appropriate mixtures of curing agents may be used. Particularly suitable curing agents for water-based coatings include carbodiamides, melamines, formaldehydes and isocyanates. Water-based carbodiamides and isocyanates may be particularly suitable in some applications because they do not add significant amounts of organic solvents to the coating compositions.

Alternatively, the polymer(s) in which the nanoparticles are dispersed can itself be the film-forming resin of the coating. In this embodiment, the nanoparticles generally comprise 2 to 20, such as 2 to 10 or 2 to 0 weight percent of the coating, and the monomer(s)/prepolymer(s)/polymer(s) generally comprise 50 to 98, such as 60 to 95 or 75 to 95 weight percent, with weight percent based on the total weight of the coating. Again, in this embodiment the coating can further comprise curing agent(s), which will generally be present in an amount of 2 to 50 weight percent, such as 20 or 10 weight percent, with the weight percent being based on the total weight of the coating.

In one embodiment, the coating is suitable for electrodeposition on a conductive substrate. In this embodiment, the nanoparticles are dispersed in an electrocoat resin. In this embodiment, it will be understood that the flexible and/or drawable substrate is conductive.

In addition to the surfactant described above, the present coatings can further comprise any number of optional ingredients known to those in the art of formulating coatings. These include, for example, flow control agents, thixotropic agents, fillers, anti-gassing agents, organic co-solvents, catalysts, and the like. Examples of these materials and suitable amounts are described in U.S. Pat. Nos. 4,220,679; 4,403,003; 4,147,769; and 5,071,904, all of which are incorporated herein by reference. If used, these optional ingredients typically comprise less than about 15 weight percent, with weight percent being based on the total weight of the coating.

As will be understood by one skilled in the art, coating film thickness and curing temperatures and conditions will depend upon the type of coating layer to be formed as well as the coating composition itself. Generally, the dry film thickness of the coating on the flexible and/or drawable substrate will be between 0.2 and 5 mils, such as 0.3 to 3 or 0.4 to 2 mils.

FIG. 1 illustrates a coated flexible and/or drawable substrate 5 comprising a flexible and/or drawable substrate 10 having a coating 20 in accordance with an embodiment of the present invention. The coating 20, as discussed above, comprises a nanoparticle dispersion (not shown). Any of the coatings described above are suitable. Particular coatings may be more suitable for one substrate than another. For example, if the flexible and/or drawable substrate is a microporous sheet, a water-based coating is particularly suitable. In another embodiment of the present invention, the flexible and/or drawable substrate is a microporous sheet and the coating is a substantially solvent free water-based coating. "Substantially solvent free" refers to less than about 15 or 20 weight percent organic solvents, such as less than 5 or 10 weight percent with weight percent being based on the total weight of the coating, for example, the coating composition may contain from 0 to 2 or 3 weight percent organic solvents.

Although the coating 20 is shown as a continuous layer or film on the surface of the substrate 10 in FIG. 1, at least a portion of the coating 20 may penetrate into the flexible and/or drawable substrate 10. In one embodiment, the flexible and/or drawable substrate 10 is a microporous sheet, and the coating 20 does not completely fill the pores of the microporous sheet 10, such that the interconnected porous structure is maintained throughout at least a portion of the sheet. The coating 20 may be applied directly to the flexible and/or drawable substrate 10. Although not required for many applications, a primer, sealer, or other undercoat (not shown) may be used between the coating 20 and the flexible and/or drawable substrate 10. Similarly, additional coating layers (not shown) can be applied on top of coating 20.

If the curing agents are used, they may be activated upon application of the coating to the flexible and/or drawable substrate. Alternatively, the curing agents may be activated during subsequent molding operations, such as compression molding or injection molding, where the elevated temperatures experienced during the molding operations are used to activate the curing agents. In this embodiment, the curing agents may be partially activated upon application to the substrate, and fully crosslinked during the subsequent molding operation.

The coating may be applied to the flexible and/or drawable substrate in any manner, such as by spraying, painting, rolling, dipping or the like. Alternatively, the coating may first be applied on a release sheet, followed by application of the coating and release sheet onto the flexible and/or drawable substrate.

For example, the coating can be first applied on a release sheet in liquid form by spraying, slide coating, roll coating, curtain coating, screen printing and/or rod coating, or equivalents thereof. Nip rollers can be used to press the exposed fact of the coating against the flexible and/or drawable substrate. Pressure applied on the release sheet as it passes through the nip rollers helps adhere the coating to the flexible and/or drawable substrate. The pressing operation can be carried out at room temperature. Alternatively, the coating composition may be adhered to the flexible and/or drawable substrate at an elevated temperature. After passing through the nip rollers, the coating may be at least partially cured by UV radiation that passes through the release sheet for those embodiments in which the polymer is UV curable. After the curing stage, the release sheet may be peeled or otherwise removed from the coating.

Figure 2:
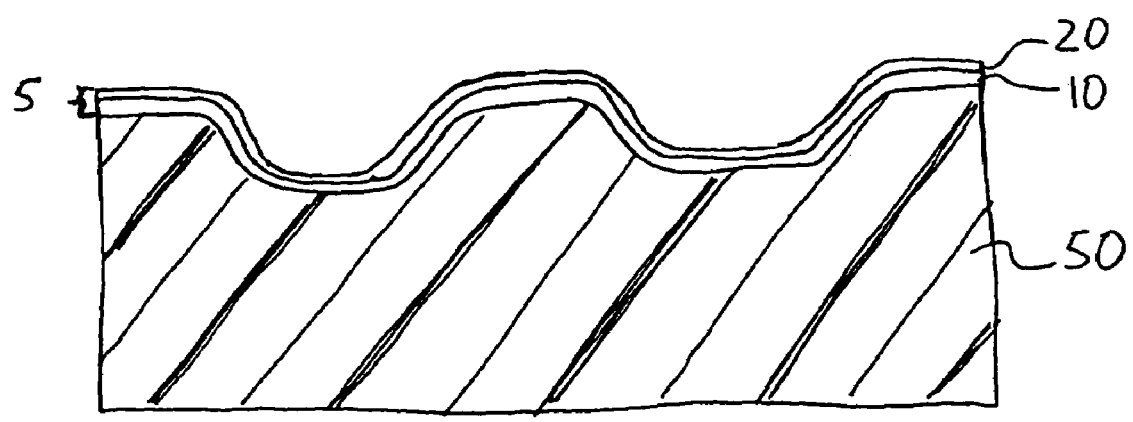
FIG. 2 is a partially schematic side view of a laminated article including a substrate covered by a coated flexible and/or drawable substrate in accordance with an embodiment of the present invention.

The present invention is further directed to a laminated article comprising a substrate and the coated flexible and/or drawable substrate as described above. In this embodiment, the coated flexible and/or drawable substrate 5 may be laminated onto a substrate material. FIG. 2 illustrates a substrate 50 made of plastic, metal, wood or the like covered by the coated flexible sheet 5. As shown in FIG. 2, the coated flexible and/or drawable substrate 10 may include deformation regions in which the flexible and/or drawable substrate 10 undergoes substantial elongation and/or compression. Lamination of the coated flexible and/or drawable substrate 10 on the substrate 50 may be achieved by any suitable technique. For example, the substrate 50 and coated flexible and/or drawable substrate 5 may be positioned between press molds and deformed to form a contoured coating layer 20 on a contoured substrate. The press molds and substrate may be heated to a suitable temperature, such as from 100 to 200° C., depending on the particular substrate being molded. Heat generated by the press molds may be used to facilitate crosslinking of the coating. Standard molding pressures may be used.

Alternatively, standard injection molding techniques may be used to produce the laminated article, wherein the coated flexible and/or drawable substrate is placed with its coated side against at least one face of a mold cavity followed by injection of any suitable thermoplastic such as polypropylene, nylon, PBT, or PET. Such thermoplastics may be reinforced with glass or other reinforcements known to those skilled in the art.

In one embodiment, the coated flexible and/or drawable substrate is laminated on the substrate during the compression molding process without the use of adhesives. In an alternative embodiment, an adhesion promoter may be used between the coated flexible and/or drawable substrate and the substrate. In this case, a layer of adhesion promoter may be preapplied to the flexible and/or drawable substrate on the opposite side from the coating or onto the substrate itself. This may be particularly useful for wood-based substrates. Standard adhesion promoters, such as urea-formaldehyde or melamine-urea-formaldehyde adhesion promoters, can be used.

During molding processes, high-drawn deformation regions may be created in the coating. In some high-draw molding operations, elongation at break of 25, 50, 75 or 100 percent, or higher, may be experienced. Elongation at break can be measured using an Instron, such as Instron Mini 44 unit equipped with a 50 N load cell. The ability of the coated flexible and/or drawable substrates of the present invention to withstand substantially elongation allows for their use in applications where their sheets undergo deformation, such as high-draw, in-mold processes.

Figure 4A:
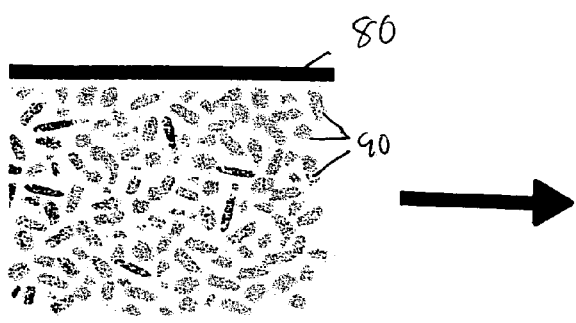
FIG. 4 is a partially schematic side view of a coating layer in accordance with an embodiment of the present invention in an unstretched (FIG. 4a) and stretched (FIG. 4b) configuration.
Figure 4B:
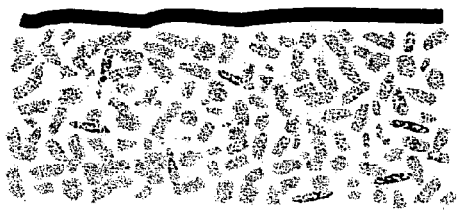

FIGS. 3 and 4 illustrate how the coatings of the present invention result in less distortion than coatings comprising standard microparticles (as distinguished from the composite microparticles of the present invention) or agglomerated nanoparticles. FIG. 3 demonstrates how the originally smooth surface of a cured coating 60 (FIG. 3a) becomes distorted over microparticles or agglomerated nanoparticles 70 as the coating is stretched (FIG. 3b). FIG. 4 demonstrates how the elongation of a cured coating according to the present invention 80 having a nanoparticle dispersion 90 results in very small scale surface distortions. This minimal distortion maintains the gloss and luster of the coating after flexing and/or drawing of the coating. The ability to maintain such gloss on flexible and/or drawable substrates, even without using a glossy clear coat, is significant.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

Polyurethane/Urea Prepolymer

This example describes the preparation of a polyurethane/urea prepolymer that was subsequently used to form the aqueous composite microparticles of Example 6. The polyurethane/urea prepolymer was prepared from a batch of the following mixture of ingredients in the ratios indicated:

| Ingredients | Equivalents | Weight (grams) |
|---|---|---|
| Charge I | | |
| N-methyl pyrrolidinone | | 269.8 |
| Hydroxyethyl methacrylate (HEMA) | 0.70 | 91.1 |
| Dimethylolpropionic acid (DMPA) | 3.50 | 234.7 |
| Triphenyl phosphite | | 2.2 |
| Dibutyltin dilaurate | | 2.2 |
| Butylated hydroxytoluene | | 2.2 |
| Charge II | | |
| Poly (butylene oxide)[1] | 1.40 | 700.0 |
| Charge III | | |
| Methylene bis(4-cyclohexylisocyanate) | 8.40 | 1100.4 |
| Charge IV | | |
| Butyl methacrylate | | 481.8 |
| Charge V | | |
| Butyl acrylate | | 642.5 |
| Charge VI | | |
| Deionized water | | 4263.3 |
| Dimethylethanolamine | 1.40 | 124.7 |
| Diethanolamine | 0.70 | 73.6 |
| Ethylenediamine | 1.40 | 42.1 |

[1]Poly (butylene oxide) having a number average molecular weight of 1000.

Charge I was stirred in the flask at a temperature of 100° C. until all solids were dissolved. Charge II was added and the mixture was reheated to 70° C. Charge III was added over a 15 minute period. Charge IV was added and the resulting mixture was held at 90° C. for 3 hours. Charge V was added. Charge VI was stirred in a separate flask and heated to 70° C. The reaction product of Charges I, II, III, IV, and V was added to Charge VI and the resulting mixture was cooled to room temperature. The final product was a white emulsion with an acid value of 15.2, a Brookfield viscosity of 800 centipoise (spindle #3 at 60 rpm), a pH of 7.4, and a nonvolatile content of 28.4% as measured at 110° C. for one hour.

Example 2

Polyurethane/Urea Prepolymer

This example describes the preparation of a polyurethane/urea prepolymer which was subsequently used to form the aqueous composite microparticles of Example 7. The polyurethane/urea was prepared from a batch of the following mixture of ingredients in the ratios indicated:

| Ingredients | Equivalents | Weight (grams) |
|---|---|---|
| Charge I | | |
| N-methyl pyrrolidinone | | 232.7 |
| Hydroxyethyl methacrylate | 1.0 | 130.1 |
| Dimethylolpropionic acid | 4.0 | 268.3 |
| Triphenyl phosphite | | 2.6 |
| Dibutyltin dilaurate | | 2.6 |
| Butylated hydroxytoluene | | 2.6 |
| Charge II | | |
| Poly (butylene oxide)[2] | 2.0 | 1000.0 |
| Charge III | | |
| 4,4'-methylenebis(cyclohexyl isocyanate) | 8.0 | 1048.0 |
| Charge IV | | |
| Butyl acrylate | | 200.0 |
| Charge V | | |
| Diethanolamine | 1.0 | 105.1 |
| Charge VI | | |
| Methyl methacrylate | | 930.6 |
| Butyl acrylate | | 730.6 |

[2]Poly (butylene oxide) having a number average molecular weight of 1000.

The polyurethane/urea was prepared in a four-neck round bottom flask equipped with an electronic temperature probe, mechanical stirrer, condenser, and a heating mantle. Charge I was stirred in the flask at a temperature of 100° C. until all solids were dissolved. Charge II was added and the mixture was cooled to 80° C. Charge III was added over a 15 minute period. Charge IV was used to rinse the addition funnel containing the isocyanate, and the temperature of the mixture was then held at 90° C. for an additional 3 hours. Charge V was added over a ten minute period followed by the addition of Charge VI. The final solution had a Gardner-Holdt viscosity of Z5+, an acid value of 23.6, and a nonvolatile content of 56.3% as measured at 110° C. for one hour.

Example 3

Acrylic Dispersant

This example describes the preparation of an acrylic dispersant which was subsequently used to form the aqueous composite microparticles of Example 4. The acrylic dispersant was prepared from a batch of the following mixture of ingredients in the ratios indicated:

| Ingredients | Weight (grams) |
|---|---|
| Charge I | |
| MAGNESOL[3] | 20.0 |
| Toluene | 120.0 |
| Charge II | |
| 2,2'-dipyridyl | 7.5 |
| Copper (0) powder | 6.1 |
| Charge III | |
| Para-toluenesulfonyl chloride | 30.4 |
| Charge IV | |
| Benzylmethacrylate | 169.2 |
| Glycidyl isopropyl ether | 20.0 |
| Charge V | |
| MPEG (550) MA[4] | 888.3 |
| Toluene | 250.0 |

[3]MAGNESOL POLYSORB 30/40, a synthetic magnesium silicate available from The Dallas Group of America.
[4]BISOMER MPEG 550MA, a methoxypolyethylene glycol methacrylate available from Laporte Specialty Organics.

Charge I was mixed in a 2 liter flask with air-stirrer, thermocouple and azeotropic distillation set-up. Charge I was heated to reflux and water was azeotroped off. Charge I was then cooled and put under a nitrogen blanket.

Charges II and III were added in order while maintaining a nitrogen blanket. Charge IV was added to an addition funnel and sparged with nitrogen for 15 minutes prior to addition. Charge IV was added to the reaction flask and the mixture was heated carefully to 70° C. When the solids reached 60.7%, Charge V was charged to an addition funnel and sparged with nitrogen for 15 minutes. Charge V was added to the reaction over 30 minutes while maintaining a 70° C. reaction temperature.

The reaction was heated for 6 hours and then cooled and stirred overnight under a nitrogen blanket. The reaction mixture was thinned with 500 g of toluene and then filtered through a cake of magnesol to remove the residual catalyst.

Solvent was removed under vacuum yielding a resin having 98.4% solids. The number average molecular weight ($M_n$) was 7469. The weight average molecular weight ($M_w$) was 9212. $M_w/M_n$ was 1.2.

Example 4

This example describes the preparation of a nano-sized PB 15:3 phthalocyanine blue pigment dispersion that was subsequently used to form the aqueous composite microparticles of Example 6. The pigment dispersion was prepared from a batch of the following mixture of ingredients in the ratios indicated:

| Ingredients | Weight (grams) |
|---|---|
| Deionized water | 2077.4 |
| Acrylic dispersant of Example 3 | 1360.8 |
| Dimethylethanolamine | 10.2 |
| PB 15:3 pigment | 2358.7 |

The ingredients were ground in an Advantis V15 Drais mill containing 0.3 mm YTZ grinding media. The mixture was milled at 1650 rpm for a total residence time of 218 minutes. The progress of the milling was monitored by measuring the visible spectra of samples and observing the decrease in absorbance at a wavelength of 400 nanometers. During the course of the milling 4535.9 g of water and 544.3 g propylene glycol monobutyl ether was added to make a final mixture with a nonvolatile content of 24.4% as measured at 110° C. for one hour. The particle size was 139 nm and the percent haze was 1.55%.

Example 5

This example describes the preparation of an Emperor 2000 carbon black pigment dispersion that was subsequently used to form the aqueous composite microparticles of Example 7. The pigment dispersion was prepared from a batch of the following mixture of ingredients in the ratios indicated:

| Ingredients | Weight (grams) | Solid Weight (grams) |
|---|---|---|
| PETROLITE D1038[5] | 40.0 | 4.0 |
| Deionized water | 48.5 | — |
| SURFYNOL 104E[6] | 0.5 | 0.25 |
| EMPEROR 2000[7] | 10.5 | 10.5 |
| BYK 024[8] | 0.5 | 0.5 |

[5]PETROLITE D1038 ethoxylated polyethylene dispersant, commercially available from Baker Petrolite.
[6]SURFYNOL 104E surfactant, commercially available from Air Products, Inc.
[7]EMPEROR 2000 carbon black pigment, commercially available from Cabot Corp.
[8]BYK 024 polysiloxane, commercially available from Byk Chemie.

The ingredients were milled in a FrymaKoruma Coball-Mill with 1 mm titanium spheres. The mixture was milled for 30 minutes at 2500 rpm with a flow rate of 9 liters/hour. The product had a non-volatile content of 14.2% as measured at 110° C. for one hour and a viscosity of 30 seconds measured using a #4 DIN cup.

Example 6

This example describes the preparation of aqueous composite microparticles that contain nano-sized PB 15:3 phthalocyanine blue pigment. The microparticles were prepared from the following ingredients:

| Ingredients | Weight (grams) |
|---|---|
| Charge I | |
| Deionized water | 70.0 |
| Polyurethane/urea of Example 1 | 300.0 |
| Propylene glycol monobutyl ether | 48.0 |
| Methyl methacrylate | 8.0 |
| Butyl acrylate | 66.0 |
| PB 15:3 phthalocyanine blue pigment dispersion of Example 4 | 25.2 |
| Charge II | |
| Deionized water | 30.0 |
| Charge III | |
| Sodium metabisulfite | 0.4 |
| Ferrous ammonium sulfate | 0.01 |
| Deionized water | 4.0 |
| Charge IV | |
| 70% t-butyl hydroperoxide | 0.4 |
| Deionized water | 16.0 |

A pre-emulsion was made by stirring Charge I with a cowles blade in a stainless steel beaker. The pre-emulsion was passed twice through a MICROFLUIDIZER M110T at 8000 psi and transferred to a four-neck round bottom flask equipped with an overhead stirrer, condenser, electronic temperature probe, and a nitrogen atmosphere. Charge II was used to rinse the MICROFLUIDIZER and added to the flask. The temperature of the microemulsion was adjusted to 30° C. The polymerization was initiated by adding Charge III followed by a 30 minute addition of Charge IV. The temperature of the reaction increased to 56° C. The final pH of the latex was 7.2, the nonvolatile content was 35.5%, and the Brookfield viscosity was 194 cps (spindle #2, 60 rpm).

Example 7

This example describes the preparation of aqueous composite microparticles that contains nano-sized Emperor 2000 carbon black pigment. The microparticles were prepared from the following ingredients:

| Ingredients | Weight (grams) |
|---|---|
| Charge I | |
| Deionized water | 294.0 |
| Dimethylethanolamine | 3.0 |
| Propylene glycol monobutyl ether | 40.0 |
| Polyurethane/urea of Example 2 | 152.73 |
| Methyl methacrylate | 27.46 |
| Butyl acrylate | 27.46 |
| EMPEROR 2000 carbon black pigment dispersion of Example 5 | 70.0 |
| Charge II | |
| Deionized water | 40.0 |
| Charge III | |
| Sodium metabisulfite | 0.4 |
| Ferrous ammonium sulfate | 0.01 |
| Deionized water | 4.0 |
| Charge IV | |
| 70% t-butyl hydroperoxide | 0.4 |
| Deionized water | 12.0 |
| Charge V | |
| Dimethylethanolamine | 2.61 |

A pre-emulsion was made by stirring Charge I with a cowles blade in a stainless steel beaker. The pre-emulsion was recycled through a MICROFLUIDIZER M110T at 8000 psi for 30 minutes and transferred to a four-neck round bottom flask equipped with an overhead stirrer, condenser, electronic temperature probe, and a nitrogen atmosphere. Charge II was used to rinse the MICROFLUIDIZER and added to the flask. The temperature of the microemulsion was adjusted to 30° C. The polymerization was initiated by adding Charge III followed by a 30 minute addition of Charge IV. The temperature of the reaction increased to 53° C. The temperature was reduced to 30° C., and Charge V was added. The final pH of the latex was 8.0, the nonvolatile content was 30.3%, the Brookfield viscosity was 110 cps (spindle #2, 50 rpm), and the mean particle size was 65 nanometers as measured using a Malvern HHPS (1.10) from Malvern Instruments, Ltd.

Example 8

This example illustrates the preparation of relatively high molecular weight polyurethane using a lower molecular weight polyether diol. A reaction vessel equipped with a stirrer, thermocouple, condenser and nitrogen inlet was charged with 1447.3 grams (g) poly(butylene oxide) having a molecular weight of about 1,000 and 145.4 g dimethylolpropionic acid and heated to 60° C. 965.3 g isophorone diisocyanate was added over 13 minutes followed by 637.5 g methyl ethyl ketone and 4.34 g dibutyltin dilaurate. The reaction exothermed to 72° C. The reaction temperature was raised to 80° C. and the contents were stirred until the isocyanate equivalent weight was 923.5. Then 114.0 g dimethylolpropionic acid was added to the reaction flask. The contents were stirred until the isocyanate equivalent weight was 1430.2.

1512.2 grams of above prepolymer at 75° C. was added over 16 minutes to a solution of 2201.9 g deionized water, 58 g adipic acid dihydrazide and 76.2 g dimethyl ethanol amine stirring at 25° C. and at 515 rpm in a cylindrical gallon reaction flask equipped with baffles, double pitched bladed stirrer, thermocouple and condenser. The dispersion temperature after this addition was 40° C. The reaction contents were stirred until no evidence of isocyanate was observed by FTIR. This dispersion was transferred to a flask equipped with a stirrer, thermocouple, condenser and a receiver. The dispersion was heated to 50° C. and methyl ethyl ketone and water were removed by vacuum distillation.

The final polyurethane dispersion had a solids content of 37.48 weight percent (measured for one hour at 110° C.), a Brookfield viscosity of 1450 centipoise using a #3 spindle at 60 rpm, an acid content of 0.240 meq acid/g, a base content of 0.247 meq base/g, a residual methyl ethyl ketone content of 1.16 weight percent and a weight average molecular weight of 77274 in DMF.

TABLE 1

Colored Coating Compositions

| Ingredient | Sample 1-A (Blue) | Sample 1-B (Black) | Sample 1-C (Blue) | Sample 1-D (Black) |
|---|---|---|---|---|
| Polyurethane Dispersion From Example 8 | 59.39 | 72.34 | — | — |
| Composite Microparticles of Example 6 | — | — | 88.50 | — |
| Composite Microparticles of Example 7 | — | — | — | 89.95 |
| OneSource 9292-T1467 (White) | 17.15 | — | — | — |
| OneSource 9292-G9463 (Green) | 0.73 | — | — | — |
| OneSource 9292-L8843 (Blue) | 7.13 | — | — | — |
| OneSource 9292-B3546 (Black) | — | 6.00 | — | — |
| OneSource 9292-S893 (Yellow Oxide) | — | — | — | — |
| OneSource 9292-Y114 (Yellow) | — | — | — | — |
| CARBODILITE V02L2 | 15.60 | 21.66 | 9.33 | 9.33 |
| UVA/HALS Mixture | — | — | 2.17 | 2.17 |
| Total | 100.00 | 100.00 | 100.00 | 100.00 |

Notes:
OneSource 9292-T1467 Tint, OneSource 9292-G9463 Tint, OneSource 9292-L8843 Tint, OneSource 9292-S893 Tint, OneSource 9292-Y114, and OneSource 9292-B3546 Tint are commercially available from PPG Industries, Inc.
CARBODILITE V02L2 is a carbodiimide crosslinker product of Nisshinbo Industries, Inc.
UVA/HALS stabilizer mixture of commercially available materials from Ciba Specialty Chemicals, TINUVIN 292 and TINUVIN 1130 and glycol ether solvent (1:3:1).

The water-based coating compositions in Table 1 were made and applied over TESLIN TS1000 using a #70 wire drawdown bar. Each drawdown was cured in a 250° F. oven for 5 minutes. Samples were evaluated for gloss and moldability by injection molding polypropylene behind the coated TESLIN. Results are summarized in Table 2. Gloss was measured using a BYK Gardner Gloss meter. Higher number value equals better gloss appearance. The moldability is equal to the controls. The mold-ability was visually rated.

TABLE 2

| Sample | Coating Description | 60° Gloss (BYK Gloss Meter) | Injection Molding Results, drawability (visual rating) |
|---|---|---|---|
| 1-A | Blue basecoat | 73 | pass |
| 1-B | Black basecoat | 75 | pass |
| 1-C | Blue coating with composite microparticles | 84 | pass |
| 1-D | Black coating with composite microparticles | 85 | pass |

The coatings comprising the composite microparticles yielded improved gloss appearance as compared to coatings with standard pigments.

Example 9

This example describes the preparation of a color imparting nanoparticulate dispersion (referred to below as a "tint") in organic solvent. The dispersion was prepared as described below from the following ingredients.

|  | PY 128 | PR 122 | PB 15:3 |
|---|---|---|---|
| % by weight of mill base |  |  |  |
| Pigment | 7.33 | 7.04 | 7.71 |
| SOLSPERSE 5000 | 0.00 | 0.00 | 1.07 |
| SOLSPERSE 22000 | 0.89 | 0.00 | 0.00 |
| SOLSPERSE 32000 | 10.04 | 9.63 | 10.54 |
| Propylene glycol n-propyl ether | 81.75 | 83.33 | 80.69 |

-continued

|  | PY 128 | PR 122 | PB 15:3 |
|---|---|---|---|
| Milling Conditions |  |  |  |
| Mill residence time (minutes) | 52 | 62 | 57 |
| Media size (mm) | 0.2 | 0.2 | 0.2 |
| Resulting Tint |  |  |  |
| % Haze* | 2.74 | 2.67 | 0.13 |
| % Total solids (by weight)** | 14.99 | 17.06 | 19.20 |
| % Pigment (by weight)** | 6.03 | 7.20 | 7.68 |

*Percent haze at a transmittance of about 17.5% at the wavelength of maximum absorbance.
**The tints were adjusted to attain these final % solids and % pigment values.
SOLSPERSE (Lubrizol Corporation, Wickliffe, Ohio).
PY 128, CROMOPHTAL Yellow 8GN (Ciba Specialty Chemicals, Inc., High Point, North Carolina).
PR 122, HOSTAPERM Pink EB Trans (Clariant Corporation, Charlotte, North Carolina).
PB 15:3, HELIOGEN Blue L 7081 D (BASF Corporation, Mount Olive, New Jersey).

Pigment Yellow 128 (PY 128) was milled and dispersed on an ADVANTIS mill (Draiswerke, Inc., Mahwah, N.J.) as shown above. Properties of the final tint are also provided. For analysis, the final tint was diluted with propylene glycol n-propyl ether. The % haze was measured with a Byk-Gardner TCS (The Color Sphere) instrument having a 500 micron cell path length.

Example 10

This example describes the preparation of an organic solvent-borne, water dispersible polymer used to prepare the aqueous dispersion of composite microparticles of Example 11 below in accordance with the present invention. The polymer was prepared as described below from the following ingredients:

|  | INGREDIENTS | WEIGHT (grams) |
|---|---|---|
| Charge 1: | ethylene glycol hexyl ether | 418.0 |
| Charge 2: | butyl acrylate | 295.8 |
|  | methyl methacrylate | 591.4 |
|  | styrene | 360.6 |
|  | glycidyl methacrylate | 194.7 |
|  | t-dodecyl mercaptan | 47.5 |
|  | VAZO 67[9] | 37.5 |
|  | ethylene glycol hexyl ether | 164.7 |
| Solvent wash: | ethylene glycol hexyl ether | 7.0 |
| Charge 3 | LUPEROX 26M50[10] | 20.2 |
|  | ethylene glycol hexyl ether | 1.8 |
| Charge 4: | LUPEROX 26M50 | 20.2 |
|  | ethylene glycol hexyl ether | 1.8 |
| Charge 5: | n-methyl ethanolamine | 60.4 |
|  | diethanolamine | 59.2 |
|  | ethylene glycol hexyl ether | 207.2 |
| Charge 6: | VESTANAT B 1358/100[11] | 1109.8 |
| Charge 7: | dibutyltin diacetate | 23.0 |
| Solvent add: | ethylene glycol butyl ether | 351.9 |

[9] Azobis 2,2-(2-methylbutyronitrile) available from DuPont de Nemours and Company.
[10] t-butyl perocotate available from Atofina Chemical Inc.
[11] Methyl ethyl ketoxime-blocked isophorone diisocyanate trimer available from Degussa AG.

Charge 1 was charged to a 3 liter flask fitted with a nitrogen inlet, condenser, stirrer and thermocouple, and heated to a temperature of 120° C. The charge was held at 120° C. and stirred during the polymerisation stage. Charge 2 (monomer feed) was fed into the reaction vessel at a uniform rate over a period of 180 minutes. Charge 3 then was added over a period of 10 minutes, and after a further 15 minute-period, Charge 4 was added over a period of 10 minutes. The reaction mixture was stirred for a further 15 minute-period. The solvent wash was then added and stirring was continued for 30 minutes to complete the polymerisation stage. The flask contents were cooled to a temperature of 90° C. and 27.4 g of distilled water were added. A Dean and Stark condenser was fitted to the flask, the temperature was increased to 128° C. and 76 g of distillate was collected. After cooling to 90° C., Charge 5 was then added and the flask contents were heated to a temperature of 128° C. This temperature was maintained for 90 minutes. After cooling to 90° C., the Charge 6 was added. Vigorous stirring was maintained until the Vestanat B was completely dissolved. The Charge 7 and solvent thin were then added and stirring was continued until the mixture was homogeneous.

Example 11

This example describes the preparation of a cationic aqueous dispersion of composite microparticles comprising the nanoparticulate dispersion of Example 9 above in accordance with the present invention. The aqueous dispersion was prepared as described below from the following ingredients:

| INGREDIENT | Weight (grams) |
|---|---|
| Polymer of Example 10 | 325.3 |
| Dispersion of Example 9 | 78.0 |
| Lactic acid[12] | 7.4 |
| Deionized water | 1989.3 |

[12] 88% aqueous solution.

The polymer of Example 10 (containing less than 2% water by weight) was charged to a plastic beaker. The solvent-borne nanopigment dispersion of Example 9 was then added to the polymer and agitation was commenced using a high-lift blade. After 5 minutes under shear, the solution appeared to be homogeneous. Lactic acid was then added under continued shear to the mixture. Deionized water was then added slowly to the mixture under continued agitation until the mixture inverted phases such that water became the continuous phase with the polymer/nanoparticulate dispersed in the aqueous phase. Diluting the microparticle dispersion with deionized water to 10% by weight non-volatile material yielded a coating bath with a viscosity less than 50 cps, pH of 4.85, and conductivity of approximately 550 microsiemens. The 10% solids bath exhibited no visual signs of particle flocculation or agglomeration.

Example 12

This example describes the preparation of an anionic aqueous dispersion of microparticles containing the nanoparticulate dispersion of Example 9 above in accordance with the present invention. The aqueous dispersion was prepared as described below from the following ingredients:

| INGREDIENT | Weight (grams) |
|---|---|
| AR210 resin[13] | 290.5 |
| Acrylic Co-polymer[14] | 29.4 |

-continued

| INGREDIENT | Weight (grams) |
|---|---|
| Dispersion of Example 9 | 78.0 |
| Deionized water | 2002.1 |

[13]Anionic electrodepositable resin component available from PPG Industries, Inc.
[14]Acrylic copolymer of 62% by weight n-butyl acrylate, 22% by weight styrene, and 16% by weight methacrylic acid, having a solids content of 79.7% in a solvent mixture of n-butyl alcohol and 2-butoxyethanol (58:42 by weight).

The acrylic polymer was charged to a plastic beaker. The solvent-borne nanopigment dispersion of Example 9 was then added and shear was commenced using a high-lift blade. After 5 minutes the admixture appeared to be homogeneous. In a separate container, AR-210 was charged and stirred with a high-lift blade. The admixture was then added slowly to the AR210 under shear. This resin mixture was then stirred for 10 minutes. Sufficient deionized water was then added to form an electrodepositable bath having a solids content of 10% by weight. The bath did not exhibit any visual signs of pigment flocculation and had a pH of 8.43, conductivity of approximately 550 microsiemens, and a viscosity of less than 50 cps.

Whereas particular embodiments of this invention have been described above for purposes of illustration, it will be evident to those skilled in the art that numerous variations of the details of the present invention may be made without departing from the invention as defined in the appended claims.

What is claimed is:

1. A coated flexible and/or drawable substrate comprising:
   a flexible and/or drawable substrate; and
   a cured film over at least a portion of the substrate, wherein the cured film has been deposited from a coating composition comprising a dispersion of resin-coated nanoparticles.

2. The coated flexible and/or drawable substrate of claim 1, wherein the nanoparticles are pigment particles.

3. The coated flexible and/or drawable substrate of claim 1, wherein the dispersion comprises polyurethane, acrylic, polyether, polyester, polyamide, thermoplastic polyolefin, poly(halo-substituted olefin), polyurea, poly(vinyl halide), poly (vinylidene halide), polystyrene, poly(vinyl ester), polycarbonate, polysulfide, polyimide, polysilane, polysiloxane, polycaprolactone, polyacrylate and/or polyinethacrylate.

4. The coated flexible and/or drawable substrate of claim 1, wherein the dispersion comprises polyurethane.

5. The coated flexible and/or drawable substrate of claim 1, wherein the dispersion comprises polyurethane acrylate.

6. The coated flexible and/or drawable substrate of claim 1, wherein the dispersion of resin-coated nanoparticles is water-based.

7. The coated flexible and/or drawable substrate of claim 1, wherein the dispersion of resin-coated nanoparticles is solvent-based.

8. The coated flexible and/or drawable substrate of claim 1, wherein the cured film has a dry film thickness of from 0.2 to 5 microns.

9. The coated flexible and/or drawable substrate of claim 1, wherein the coating composition further comprises a film-forming resin.

10. The coated flexible and/or drawable substrate of claim 9, wherein the film-forming resin comprises a substantially solvent-free, water-based resin having less than 20 wt % organic solvents.

11. The coated flexible and/or drawable substrate of claim 10, wherein the resin comprises polyurethane, acrylic polymer or copolymer, polyester, polyether, polycarbonate, polyamide, polymer derived from epoxy-containing polymer and/or vinyl polymer and/or copolymer.

12. The coated flexible and/or drawable substrate of claim 1, wherein the substrate is a microporous sheet.

13. The coated flexible and/or drawable substrate of claim 12, wherein the microporous sheet comprises a polymer matrix and at least about 30 weight percent filler particles.

14. The coated flexible and/or drawable substrate of claim 12, wherein the microporous sheet comprises a polymer matrix and at least about 50 weight percent silica filler particles.

15. The coated flexible and/or drawable substrate of claim 12, wherein the microporous sheet comprises a polyethylene matrix and from about 30 to about 95 volume percent pores.

16. A laminated article comprising:
    a substrate; and
    the coated flexible and/or drawable substrate of claim 1.

17. The article of claim 16, wherein the substrate comprises compression molded or injection molded plastic.

18. The article of claim 16, wherein the flexible and/or drawable substrate is a microporous sheet.

19. The article of claim 18, wherein the microporous sheet is adhered directly to the substrate without an adhesive layer.

20. The article of claim 18, wherein at least a portion of the microporous sheet has been elongated.

21. The article of claim 20, wherein the elongation is at least 25 percent.

22. A method of making a laminated article, the method comprising:
    providing a substrate material; and
    adhering the coated flexible and/or drawable substrate of claim 1 to the substrate material.

23. The method of claim 22, wherein the coated flexible and/or drawable substrate is a coated microporous sheet.

24. The method of claim 23, wherein the flexible and/or drawable substrate is adhered directly to the substrate without an adhesive layer.

25. The method of claim 23, wherein at least a portion of the coated microporous sheet is elongated during the adhering step.

26. The method of claim 25, wherein the elongation is at least 25 percent.

27. The method of claim 23, wherein the substrate comprises compression molded or injection molded plastic.

28. A method of coating a flexible and/or drawable substrate comprising:
    applying a coating composition to at least a portion of the flexible and/or drawable substrate; and
    curing the coating composition,
    wherein the coating composition comprises a dispersion of resin-coated nanoparticles and wherein the cured coating composition comprises a film.

29. The method of claim 28 wherein the nanoparticles are pigment particles.

30. The method of claim 28, wherein the dispersion comprises polyurethane, acrylic, polyether, polyester, polyamide, thermoplastic polyolefin, poly(halo-substituted olefin), polyurea, poly(vinyl halide), poly (vinylidene halide), polystyrene, poly(vinyl ester), polycarbonate, polysulfide, polyimide, polysilane, polysiloxane, polycaprolactone, polyacrylate and/or polymethacrylate.

31. The method of claim 28, wherein the dispersion comprises polyurethane.

32. The method of claim 28, wherein the dispersion comprises polyurethane acrylate.

33. The method of claim 28, wherein the coating composition further comprises a film-forming resin.

34. The method of claim 33, wherein the film-forming resin comprises a substantially solvent-free, water-based resin having less than 20 wt % organic solvents.

35. The method of claim 34, wherein the resin comprises polyurethane, acrylic polymer or copolymer, polyester, polyether, polycarbonate, polyamide, polymer derived from epoxy-containing polymer and/or vinyl polymer and/or copolymer.

36. The coated flexible and/or drawable substrate of claim 28, wherein the dispersion of resin-coated nanoparticles is water-based.

37. The coated flexible and/or drawable substrate of claim 28, wherein the dispersion of resin-coated nanoparticles is solvent-based.

* * * * *

UNITED STATES PATENT AND TRADEMARK OFFICE
CERTIFICATE OF CORRECTION

| | | |
|---|---|---|
| PATENT NO. | : 7,438,972 B2 | Page 1 of 1 |
| APPLICATION NO. | : 10/876315 | |
| DATED | : October 21, 2008 | |
| INVENTOR(S) | : Dennis L. Faler, Anthony D. Kulfan and Victoria A. Trettel | |

It is certified that error appears in the above-identified patent and that said Letters Patent is hereby corrected as shown below:

Column 23, line 27, "polyinethacrylate" should be --polymethacrylate--.

Signed and Sealed this

Thirtieth Day of June, 2009

JOHN DOLL
*Acting Director of the United States Patent and Trademark Office*